US008484152B2

(12) United States Patent
Hoglund

(10) Patent No.: US 8,484,152 B2
(45) Date of Patent: Jul. 9, 2013

(54) FUZZY HASH ALGORITHM

(75) Inventor: Michael Gregory Hoglund, Monte Sereno, CA (US)

(73) Assignee: HBGary, Inc., Sacramento, CA (US)

( * ) Notice: Subject to any disclaimer, the term of this patent is extended or adjusted under 35 U.S.C. 154(b) by 941 days.

(21) Appl. No.: 12/459,203

(22) Filed: Jun. 26, 2009

(65) Prior Publication Data

US 2011/0093426 A1 Apr. 21, 2011

(51) Int. Cl.
*G06F 9/44* (2006.01)
*G06N 7/02* (2006.01)
*G06N 7/06* (2006.01)

(52) U.S. Cl.
USPC .......................................................... 706/52

(58) Field of Classification Search
USPC .......................................................... 706/52
See application file for complete search history.

(56) References Cited

U.S. PATENT DOCUMENTS

| | | | |
|---|---|---|---|
| 5,923,872 A | 7/1999 | Chrysos et al. | |
| 6,683,546 B1 | 1/2004 | Torrubia-Saez | |
| 7,233,935 B1 | 6/2007 | Chandler | |
| 7,711,779 B2 * | 5/2010 | Goodman et al. | 709/206 |
| 8,055,599 B1 * | 11/2011 | Werth | 706/45 |
| 8,103,875 B1 * | 1/2012 | Ramzan et al. | 713/170 |
| 8,335,750 B1 * | 12/2012 | Werth | 706/12 |
| 2002/0188859 A1 | 12/2002 | Dollens | |
| 2003/0065926 A1 | 4/2003 | Schultz et al. | |
| 2003/0078899 A1 | 4/2003 | Shanahan | |
| 2005/0060643 A1 | 3/2005 | Glass et al. | |
| 2006/0020397 A1 | 1/2006 | Kermani | |
| 2006/0029975 A1 | 2/2006 | Barber et al. | |
| 2007/0092103 A1 * | 4/2007 | Mihcak et al. | 382/100 |
| 2007/0180262 A1 | 8/2007 | Benson | |
| 2007/0240217 A1 | 10/2007 | Tuvell et al. | |
| 2008/0040505 A1 | 2/2008 | Britto et al. | |
| 2008/0127336 A1 | 5/2008 | Sun et al. | |
| 2008/0184367 A1 | 7/2008 | McMillan et al. | |
| 2009/0126012 A1 | 5/2009 | Treadwell et al. | |
| 2009/0165131 A1 | 6/2009 | Treadwell | |
| 2009/0271454 A1 | 10/2009 | Anglin et al. | |
| 2010/0030996 A1 | 2/2010 | Butler, II | |

OTHER PUBLICATIONS

Kornblum, J., "Identifying Almost Identical Files Using Context Triggered Piecewise Hashing", Digital Investigations 3S, pp. 1-7, 2006.*
Roussev, V., "Hashing and Data Fingerprinting in Digital Forensics", IEEE Digital Forensics, pp. 49-55, Mar. 2009.*
Wiehe et al., "Quantitative Analysis of Efficient Antispam Techniques", IEEE Workshop on Information Assurance, pp. 1-7, 2006.*
Stein, B., "Fuzzy-Fingerprints for Text-Based Information Retrieval", Journal of Universal Computer Science, pp. 572-579, 2005.*
Notification Concerning Trans. of Int'l Prelim. Report on Patentability dated Jan. 12, 2012, 1 page.

(Continued)

*Primary Examiner* — Michael B Holmes
(74) *Attorney, Agent, or Firm* — Morrison & Foerster LLP

(57) ABSTRACT

An embodiment of the invention provides a method for and an apparatus for classifying a data object by use of a fuzzy hash. The method and apparatus can perform steps including: aligning a window in a target data object; reading content within the window; hashing the content within the window in order to calculate a hash value; splicing a spliced portion from the hashed value; and storing the spliced portion as part of a fuzzy hash.

36 Claims, 11 Drawing Sheets

OTHER PUBLICATIONS

International Preliminary Report on Patentability dated Jan. 4, 2012, 1 page.
Written Opinion of the International Searching Authority dated Oct. 4, 2011, 3 pages.
Written Opinion of International Searching Authority Supplemental Boxes dated Oct. 4, 2011, Parts I & II.
USPTO Office Action dated Mar. 27, 2012 for U.S. Appl. No. 12/386,970; 21 pgs.
Notification of Transmittal of the Int'l. Preliminary Report on Patentability dated Apr. 28, 2011, 1 pg.
"Identifying almost identical files using context triggered piecewise hashing" by J. Kornblum, © 2006. Retrieved from the internet: http://dfrws.org/2006/proceedings/12-Kornbl.
"md5bloom: Forensic filesystem hashing revisited" by V. Roussev, et al., © 2006. Retrieved from the internet: http://dfrws.org/2006/proceedings/11-Roussev.pdf. Total pp. 9.
"Multi-resolution similarity hashing" by V. Roussev, et al., © 2007. Retrieved from the internet:http://www.dfrws.org/2007/proceedings/p105-roussev.pdf. Total pp. 9.
Notification of Transmittal of the Int. Search Report and the Written Opinion of the Int. Searching Authority, or the Declaration dated Nov. 4, 2010, 1 pg.
Notification of Transmittal of the Int. Search Report and the Written Opinion of the Int. Searching Authority, or the Declaration dated Nov. 4, 2010, 3 pgs.
Written Opinion of the International Searching Authority dated Nov. 4, 2010, 4 pgs.
Search History for Application No. PCT/US2010/00211 dated Jul. 7, 2010, 3 pgs.
Notification of Transmittal of the Int. Search Report and the Written Opinion of the Int. Searching Authority, or the Declaration dated Oct. 4, 2010, 1 pg.
Notification of Transmittal of the Int. Search Report and the Written Opinion of the Int. Searching Authority, or the Declaration dated Oct. 4, 2010, 3 pgs.
Written Opinion of the International Searching Authority dated Nov. 4, 2010, 5 pgs.
Written Opinion of the ISA dated Nov. 4, 2010, 4 pgs.
Hoglund, U.S. Office Action mailed Jan. 2, 2013, directed to U.S. Appl. No. 12/386,970; 18 pages.

* cited by examiner

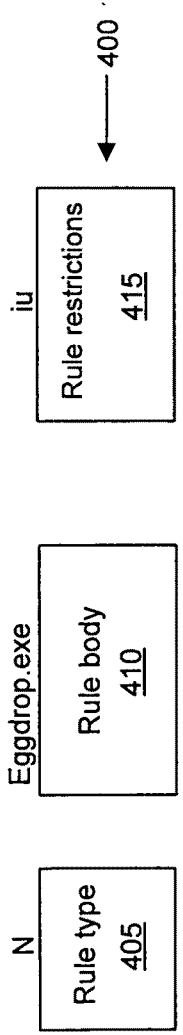
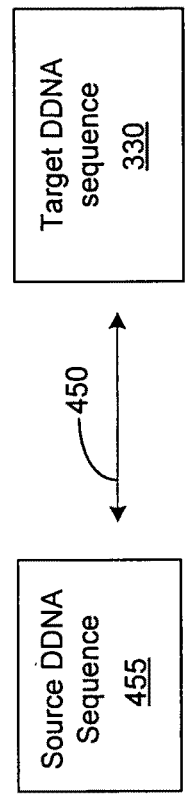
```
Z"F92EC292021302C252C76ECECDF12E5DADA34BA94456D"k AND %MATCHPERCENT% > 80
^ ^                                             \       \
|  \                                             \       435
|   \                                             \
|    \                                             +-- 430 (kernel mode)
|     \
|      +---- string (420) of the hash
|
+---- rule type Z is fuzzy hash
```
FIGURE 4B
FIGURE 4C

Digital DNA Explorer

| | Open | Compare All | | | | _ □ X |
|---|---|---|---|---|---|---|

| | Name | Hash | Match |
|---|---|---|---|
| F0AE8752D203699EB8BC6674543594 5C807F0D89 350EA502699D69F35AC0D1AA9D6CDA9F44EDBB7 424EF3616833F1A0E14FFD2693398DF1B5DB6CB5 386 | page 8 (00008000-000088... .\\\Zx32-unobfuscated.sys | F77BC989F33CC5E457168FE3B2E4F1... | 0% |
| | page 0 (00000000-000010... | F0AE8752D143692EB8BC66705226A... | 39.20571428571 43% ←505 |
| | page 1 (00001000-000020... | 4807F0DB9350EA502699D69F3SAC0... | 37.28813559322 03% ←510 |
| Compare DDNA Subseque... ■ □ X | page 2 (00002000-000030... | 1E13CA337428558AA1F5C270AE0AB... | 0.80495575212389% |
| F0AE8752D 203699EB8BC6674543594 5C807F0 DB1B5DB6CB535B6 | page 3 (00003000-000040... | 468E86CC792455618EAE319F5F7EE6... | 0% |
| ↓ | page 4 (00004000-000050... | E452BB4E5AE38355B88F775C1E042E... | 0% |
| F0AE8752D143692EB8BC66705225AB25 | page 5 (00005000-000060... | 14F7F81859616F29136660 04BE82CB9... | 0% |
| | page 6 (00006000-000070... | DBBC5DDB775B663A26673AB43D84B... | 0% |
| Offset: 0 | page 7 (00007000-000080... | | |
| Hash Offset \| Binary Offset & TriggerHash | ... | | |
| 31 fuzzy hash index:31 binary offset: 0 | \voriginal-dropped fzx32_sys.sys | | |
| 30 fuzzy hash index:30 binary offset: 0 | page 0 (00000000-000010... | F0AE8752D203699EB8BC6674543594... | 100% ←515 |
| ... | page 1 (00001000-000020... | 64FC275CD2486688A82C2B9427C54... | 0% |
| 25 fuzzy hash index:25 binary offset: 0 | page 2 (00002000-000030... | 1C2482F4545DF7CFC2F006948909 4... | 0% |
| 24 fuzzy hash index:24 binary offset: 0 | page 3 (00003000-000040... | 8E3332109D25C9080AE480C57E84B... | 0% |
| 23 fuzzy hash index:23 binary offset: 0 | page 4 (00004000-000050... | 4C51A3D58B5BEC66A77F4E2BB1D51... | 0% |
| | page 5 (00005000-000060... | EAAC66B5426606D3A3115BFEDA27D... | 0% |
| | page 6 (00006000-000070... | 98B48BD3DB70938B31FD4C0232825... | 0% |
| | page 7 (00007000-000080... | F81068572EB81A59369392 42DE4A7... | 2.56410256410256% |

Detect Rustock.B multiple versions

Detect jpg image embedded in word document

Two text files that are largely similar

FUZZY HASH ALGORITHM

BACKGROUND

Interconnected systems, such as, for example, the global Internet, can deliver information to more people at a faster speed and is important in the current global economy. However, as recent history has shown, these interconnected systems are often dealing with security risk issues. Security risks include, but are not limited to, for example, identity theft and theft of proprietary information. In many cases, information theft is facilitated by malicious software (malware) that has exploited a computer system. Malware is typically is software designed to infiltrate or damage a computer system without the owner's informed consent or knowledge.

Because malware exists, there is a need to detect malware as a method of defense against information theft. However, previous approaches are unable to detect variations of an original file in memory (RAM). This includes, but is not limited to, files that represent an executable in memory. By extension, previous approaches are not efficient in detecting executables in RAM, particularly if some parts of the executable portions are altered at runtime. Additionally, previous approaches are not efficient in detecting variants of the same malware or malware protected by a packer or encryptor. Therefore, the current technology is limited in its capabilities and suffers from at least the above constraints and deficiencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 4A is a block diagram that illustrates an example of a rule, in accordance with an embodiment of the invention.

FIG. 4B is a block diagram of an example rule for a fuzzy hash algorithm, in accordance with an embodiment of the invention.

FIG. 4C is a block diagram that illustrates an engine comparing a source digital DNA sequence (which contains a reference fuzzy hash value) with a target digital DNA sequence which contains a calculated fuzzy hash value, in accordance with an embodiment of the invention.

FIG. 5 is a screen shot that illustrates multiple versions of a target data object that are detected by an engine, in accordance with an embodiment of the invention.

FIG. 6 is a screen shot of another example of the fuzzy hash comparison method that is performed by the engine 160, in accordance with an embodiment of the invention.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
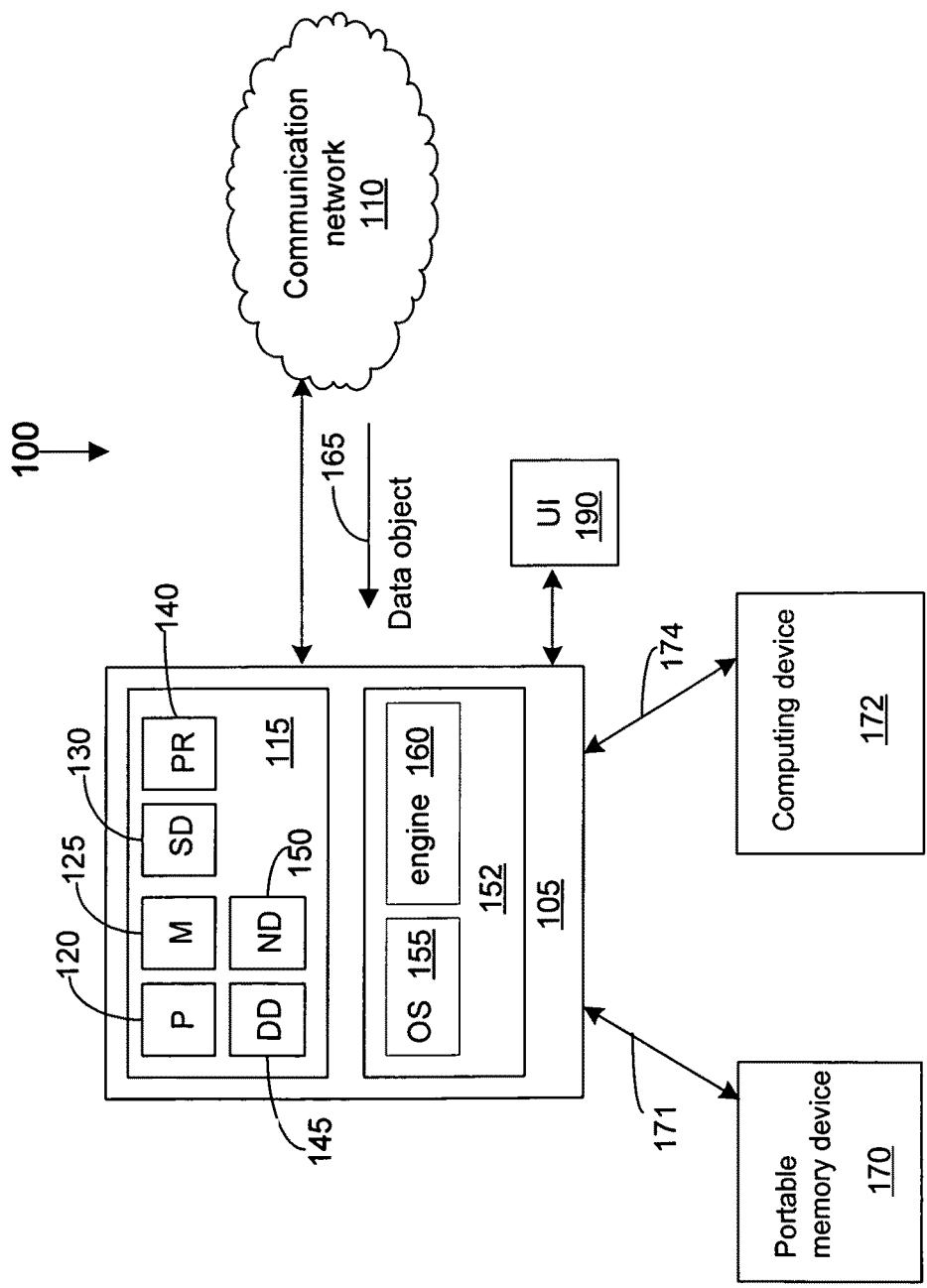
FIG. 1 is a block diagram of an apparatus (system) in accordance with an embodiment of the invention.

FIG. 1 is a block diagram of an apparatus (system) 100 that can be used in an embodiment of the invention. An example device 105 is connectable to a communication network 110. In another embodiment of the invention, the device 105 is a stand-alone computer that is not connected to a network. The device 105 can be, for example, a server or a computer. The optional network 110 is, for example, a public network such as a wide area network (e.g., Internet), a local area network (LAN), or a different type of private network or public network.

The device 105 includes standard hardware elements 115 that are used in computing operations or data transmissions. For example, the hardware elements 115 includes a processor 120, one or more memory devices 125, storage devices 130 such as disks, ports 140, a disk driver 145, a network driver 150, and/or other known hardware elements that are used in computing devices.

The device 105 also includes software elements 152 such as, for example, an operating system 155 that performs management functions and other functions that are known to those skilled in the art. Other standard hardware, software, or firmware components that can be used in the device 105 are not shown in FIG. 1 for purposes of clarity in the drawings.

In an embodiment of the invention, the processor 120 can execute a digital DNA (DDNA) sequencing engine 160 that performs various steps in the methods discussed below. In one embodiment, the sequencing engine 160 will execute a fuzzy hash algorithm in order to generate a fuzzy hash value based on a search of the content of a field of a data object 165, as will be described below. In other embodiments of the invention, the processor 120 can execute a digital DNA sequencing engine 160 that also performs various additional steps as previously described in U.S. patent application Ser. No. 12/386,970, entitled DIGITAL DNA SEQUENCE, by Michael Gregory Hoglund, filed on Apr. 24, 2009. U.S. patent application Ser. No. 12/386,970 is hereby incorporated herein by reference.

The engine 160 is formed by software code based on a standard programming language (e.g., C, C++, or other suitable languages). The code in the engine 160 can be varied in order to vary, implement, or remove the various functions that will be discussed below.

As will be described below in the additional details or examples, the digital DNA sequencing engine 160 will evaluate any target data object 165 that is received by the device 105 via the network 110. Alternatively, the target data object 165 to be evaluated by the engine 160 is any object that is already represented (already existent or introduced) in a physical memory associated with device 105, regardless of how that object 165 was received in or stored in the physical memory. The engine 160 will evaluate the data object 165 based upon rules that may be stored in a database or stored in the device 105 itself or in other suitable storage devices. For example, the rules can be stored in a memory 125 in the device 105 itself, in a portable memory device 170 that can be connected to the device 105, or in a computing device 172 that communicates via link 174 with the device 105. The portable memory device 105 can be, for example, a compact disk, portable disk drive, memory disk, USB-coupled memory chip, or other types of portable memory devices. The external link 171 to the portable memory device 170 can be, for example, USB.

The computing device 172 can be, for example, a server or another type of computing device. The link 174 can be a wired or wireless link and can also be, for example, a type of network connection such as, e.g., a LAN or private network.

Based on the evaluation of the data object 165, the engine 160 will then generate a digital DNA sequence which permits the data object 165 to be classified into an object type. In an embodiment of the invention, this DDNA sequence will contain fuzzy hash values that is calculated and generated by the engine 160, as will be discussed below in additional details. The data object 165 can be any suitable digital object(s) that can be received by the device 105 (or data'object 165 that is already in physical memory) such as, for example, but not limited to, data files such as Microsoft Word files, Adobe PDF files, modules, downloadable computer programs, html pages or other web pages, and/or other known suitable digital documents and objects. Therefore the engine 160 provides a method that calculates a fuzzy hash that classifies a data object.

Figure 2:
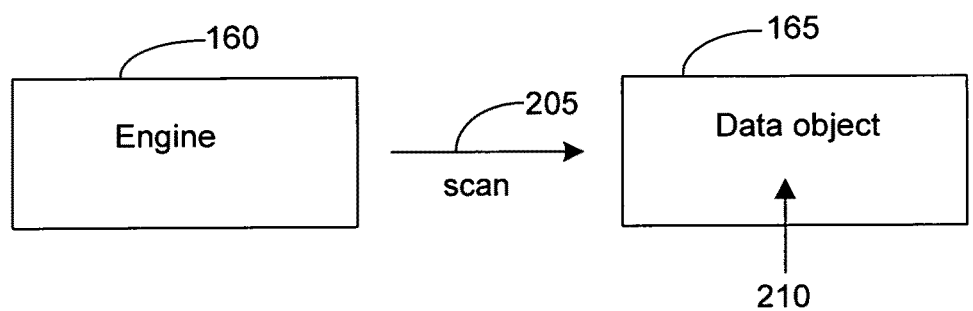
FIG. 2 is a block diagram that illustrates an operation of a system in accordance with an embodiment of the invention, where an engine will scan the fields of a data object.

FIG. 2 is a block diagram that illustrates an operation of a system in accordance with an embodiment of the invention. The digital DNA (DDNA) sequencing engine 160 will scan 205 the data field (or data fields) 210 of a data object 165 that has been received by the device 105 (FIG. 1) or data object 165 that is already in physical memory. Typically, the data object 165 will be stored in the memory 125 before scanning 205 of the fields 210.

Figure 3:
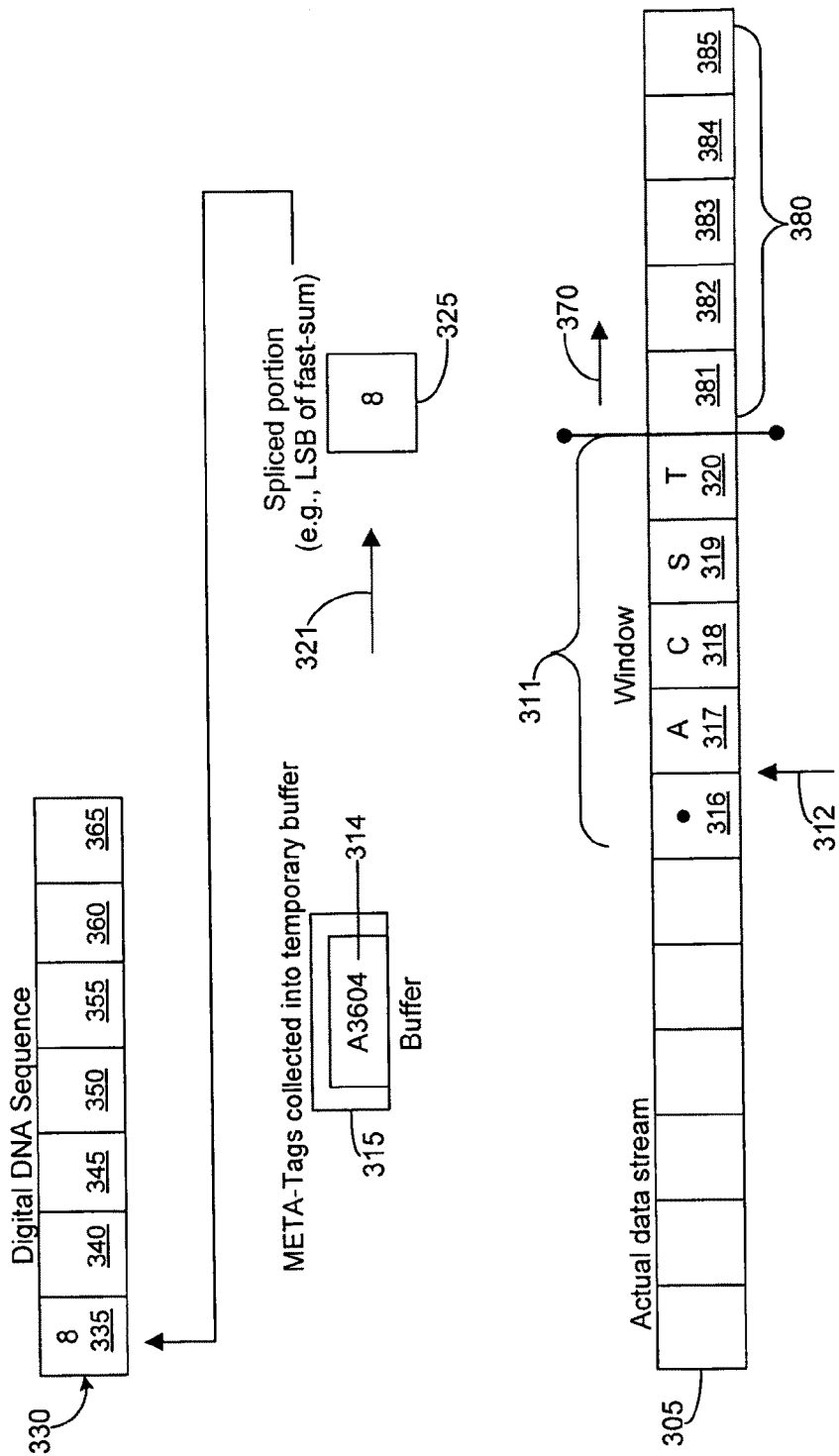
FIG. 3 is a block diagram that illustrates an overview of a fuzzy hash algorithm that calculates a fuzzy hash, in accordance with an embodiment of the invention.

FIG. 3 is a block diagram that illustrates an overview of a fuzzy hash algorithm that calculates a fuzzy hash, in accordance with an embodiment of the invention. As will be discussed below, this fuzzy hash value is used in one method for classifying a data object into an object type. A fuzzy hash value is a calculated sequence of bytes (e.g., hexadecimal bytes) where the values are calculated as described herein. A data stream 305 is data content of a data object 165 (FIG. 2). In an embodiment of the invention, the engine 160 (FIG. 1) will include a disassembler (disassembler code) that performs the below functions. The engine 160 (FIG. 1) will align a window 311 on the data stream 305, starting at an alignment position 312 on the data stream 305, and will read the stream 305 values within the window 311. The engine 160 will place meta-tags (i.e., metadata tags) 314 in a buffer 315, where a meta-tag corresponds to a value in the data stream 305. The buffer 315 can be, for example, a memory area in the memory 125 (FIG. 1) of device 105 or a memory area in another suitable memory device such as, for example, the portable memory device 170 (FIG. 1) or a memory area in the external computing device 172 (FIG. 1).

In the example of FIG. 2, assume that the sample blocks 316-320 (within the window 311 of the data stream 305) has the following example data contents, respectively:

(1) block 316 contains an instruction byte which is represented by the example symbol ".".
(2) block 317 contains an arithmetic operation which is represented by the example symbol "A".
(3) block 318 contains a constant value which is represented by the example symbol "C".
(4) block 319 contains a shift operation which is represented by the example symbol "S".
(5) block 320 contains a trigger as discussed below which is represented by the example symbol "T".

Note that the contents in the blocks of stream 305 can vary in other examples. Therefore, the example contents for blocks 316-320 of FIG. 3 are not necessary limiting in an embodiment of the invention.

In an embodiment of the invention, the engine 160 will ignore an instruction byte (such as the instruction byte in block 316) and, therefore, will not place the instruction byte as a meta-tag into the buffer 315.

In an embodiment of the invention, the engine 160 will insert, into buffer 315, a meta-tag that corresponds to the type of operation instruction that is in block 317 of the stream 305. Each specific operation instruction will correspond to a specific byte value that will be placed as a meta-tag into the buffer 315. In the example of FIG. 3, the byte value A represents a specific byte value that corresponds to an arithmetic operation that is in block 317.

In an embodiment of the invention, the engine 160 will insert, into buffer 315, a meta-tag that corresponds to constant in block 318. This meta-tag is the actual numerical value of the constant in a block in the data stream 305. In the example of FIG. 3, the constant "360" is inserted into the buffer 315 as a meta-tag because the corresponding block 318 contains the constant value "360".

In an embodiment of the invention, the engine 160 will insert, into buffer 315, a meta-tag that corresponds to the actual numerical value of the number of shifts as contained in block 319. In the example of FIG. 3, the block 319 contains shift-4 which will cause the shifting of bits by 4. Therefore, the engine 160 will insert, into buffer 315, a meta-tag that is the value "4" which corresponds to the number of shifts as contained in block 319.

Note that the programmer can program any particular meta-tag to correspond to a specific content in a block in the data stream 305. A meta-tag can correspond to a pre-selected byte value. Therefore, a particular meta-tag will correspond to a particular byte value. Particular examples of meta-tags that correspond to specific contents in the blocks of the data stream 305 are listed above. The programmer can program the engine 160 to generate other examples of meta-tags that correspond to other types of contents in the blocks of the data stream 305.

In the example of FIG. 3, the engine 160 will concatenate the meta-tags (that are stored in buffer 315) into the concatenated meta-tag 314 with the example symbol "A3604" which will be concatenated byte values. In the example of FIG. 3, the concatenated meta-tag 314 with the value "A3604" is associated with the contents in blocks 316-319 of the data stream 305. The concatenated meta-tag 314 will have a value that is dependent on the contents in the blocks that are within a window 311.

In an embodiment of the invention, when the engine 160 detects a trigger T in the window 311, the engine 160 will hash over the range of values produced from the contents in the blocks within the window 311. Therefore, the concatenated meta-tag 314 is hashed into a hash value 321, where the hash value is generically symbolized as arrow 321 in FIG. 3. In the example of FIG. 3, the concatenated meta-tag value (symbol)

of "A3604" will be hashed into a smaller value such as, for example, a single byte with the value "8". In an embodiment of the invention, the hash value 321 is a summation of the contents in the concatenated meta-tag 314. Any suitable hash operation may be used instead, for example an MD5 checksum. An advantage of summation value is that it is not order dependent on the contents in the concatenated meta-tag 314. The hash value 321 will be dependent on the contents of the blocks within the window 311.

The engine 160 will then splice a spliced portion 325 in the hash value 321 and will then place that spliced portion 325 into the DDNA sequence 330. As an example, this spliced portion 325 is the least significant byte (LSB) of the hash value 321. In the example of FIG. 3, this spliced portion 325 has a value of "8" for the hash value of the meta-tag with the example content "A3604". The engine 160 will place the spliced portion 325 value of "8" into a block 335 of the DDNA sequence 330, as shown in FIG. 3.

The LSB 325 is effectively a DNA marker that is placed into the DDNA sequence 330. Therefore, the DDNA sequence 330 will contain block values in example blocks 335-365, where the block values are DNA markers associated with the values within the different windows 311 of the data stream 305. The number(s) or content in the spliced portion 325 is effectively a quantification of the qualities and/or attributes of the content that is overlapped by a window 311 in a data object. Therefore, the spliced portions 325 are values that are assigned to the data object and are based upon the qualities and/or attributes of the data object.

Note that the spliced portion 325 of a hash value 321 is not necessarily limited to an LSB of the hash value 321. Other suitable portions of the hash value 321 may be used as the content of the spliced portion 325 such as, for example, another significant byte of the hash value 321, a pre-programmed (pre-determined) number of bits of the hash value 321, or another type of a pre-determined portion of the hash value 321. The spliced portion 325 is a value (or number) that is assigned to an attribute of the data stream after quantifying the qualities of that attribute.

The DDNA sequence 330 can be stored in a memory area such as, for example, a memory area in the memory 125 (FIG. 1) of device 105 or a memory area in another suitable memory device such as, for example, the portable memory device 170 (FIG. 1) or a memory area in the external computing device 172 (FIG. 1).

The engine 160 will then slide 370 the window 311 along the data stream 305, so that the window 311 will then overlap the next range 380 of blocks in the data stream 305 and the engine 160 then reads the values of this next range 380 of blocks in the data stream 305. In the example of FIG. 3, this next range 380 that will be overlapped by the window 311 has the blocks 381-385. As an example, if the window 311 will overlap, e.g., 4 bytes of data (or another present range of bytes), then the window 311 will overlap a new set of data blocks of 4 bytes for each time that the window 311 will slide 370 along the data stream. The window 311 will slide 370 to cover a new set of data blocks until all data blocks in the data stream 305 has been overlapped by the window 311. The engine 160 will then generate a corresponding meta-tag for each of the values in the blocks 381-381 and concatenate the meta-tags and store the concatenated meta-tag into the buffer 315, in a manner as similarly discussed above. The engine 160 will then hash the concatenated meta-tag by use of a hashing operation that generates another hash value that corresponds to the values in the blocks 381-385 when a trigger T is detected within the range 380. A reduced portion of the hash value is then stored in a subsequent bin 340 in the DNA sequence 330. Therefore, the digital DNA sequence 330 will contain values in the example blocks 335-365 that form an abstraction of the information in the data stream 305. This abstraction of information is effectively a "fuzzy hash" of the data stream 305 because this abstraction of information is a focused hash value of the data stream 305.

As mentioned above, a trigger "T" in block 220 will cause the engine 160 to hash the value of the concatenated meta-tag 314 into a hash value 321. A trigger (T) can be any variety of suitable conditions that is chosen by the programmer. The programmer can set a trigger to be, for example, a branch instruction, a function entry and/or function exit, or a shift register.

A trigger T depends on the underlying data structure type of the data stream 305. For example, if the engine 160 determines the portion in window 311 as code data, then the engine 160 will look for a trigger T that is a branch instruction, or/and entry/exit functions, or other functions. As will also be described below, the trigger T type can vary, depending on the data type (e.g., text, code, binary data, or high entropy data).

As another example for a trigger T, the changes in a constant stream of bytes in the data stream 305 can be used as triggers. The programmer can use, for example, the sum of the last four bytes in data stream 305 to produce a numerical output. Again, the method used to determine the trigger T depends on the underlying data structure type of the data stream 305. A stream of zeros produces a constant stable numerical output of zeros, while a stream of the Intel x86 NOP instructions (0x90) produces a constant stable numerical output (0x1A), and a stream of byte-padding used by the Microsoft C++ compiler (0xCC) produces a constant stable numerical output (0x44). As an example, when a stable output of 0x90 is produced and the 0x90 output then ends, and a new stream of zeros (0x00) begins, then triggers will occur in the transition of the output values from 0x90 to 0x00, and the 0x00 output then subsequently stabilizes. The triggers in the output transition can then be used as a trigger that initiates the hashing of the concatenated meta-tag corresponding to contents within a window 311. As discussed above, this hashing of the concatenated meta-tag will arithmetically reduce the hash value 311 into a spliced portion value 325 for inclusion in the DDNA sequence 330. Table 1 below illustrates an example of triggers A0, 40, and 80 in the bit stream as the 0x90 output values transition to the 0x00 output values.

TABLE 1

| | |
|---|---|
| 1A | |
| 1A | |
| 1A | |
| 1A | |
| 1A | |
| 1A | |
| 1A | |
| 1A | |
| 1A | |
| 1A | |
| 1A | |
| 1A | |
| 1A | <-- stable output due to 0x90 ends here. |
| 34 | <-- new 0x00 stream begins here. |
| 68 | |
| D0 | |
| A0 | - trigger |
| 40 | - trigger |
| 80 | - trigger |
| 00 | <-- at this point, the output has stabilized. |
| 00 | |
| 00 | |
| 00 | |
| 00 | |

TABLE 1-continued

```
00
00
00
00
00
00
00
00
```

FIG. 4A illustrates an example of a rule 400 with the following example three components: N"eggdrop.exe"iu. If a rule 400 fires, then that firing rule is also referred herein as a matching expression 400. The engine 160 will use the rule 400 in order to perform the operations discussed below. A rule 400 can be stored, for example, in the memory 125 (FIG. 1) in the device 105, in the portable memory device 170 that can be connected to the device 105, or in the computing device 172 that communicates via link 174 with the device 105.

A rule 400 has three components as shown in FIG. 4A. A Rule type 405 indicates which algorithm to use when calculation occurs. Note also that an expression can be formed from a plurality of individual or atomic expression (individual rules). Multiple expressions can be combined by use of Boolean operators (e.g., AND, OR and/or NOT operators). A description of the different rule types 405 is also described in the above-mentioned U.S. patent application Ser. No. 12/386,970, entitled DIGITAL DNA SEQUENCE. The function of the rule type 405 is not limited to the examples disclosed herein, and can be configured to any desired search and match function that can be designed by the user for the engine 160. A rule type 405 can search for any data pattern such as, for example, a substring, byte pattern, name of a process that will contain data to be matched, and/or the like. The rule type, N, indicates a name to be matched with the content of a target data object field 210 (FIG. 2) (where the name N is a name of, e.g., a module, driver, file, process, or other objects).

The Rule Body 410 indicates the criteria for a match, and is coupled to (and dependent on) the Rule type 405 that is being used. The text, "eggdrop.exe", indicates an example string to be matched in the content of a target data object field 210 (FIG. 2).

The Rule Restrictions 415 is an optional feature in the expression 400. The rule restrictions 415 indicate optional controls to be placed on the rule to be applied by the expression 400, and are dependent upon both the Rule Body 410 and Rule type 405. For example, a restrictor 415 can indicate if the text to be matched will be case sensitive or case insensitive, or if the text to be searched is in the kernel address or user address, or if the text has to occur in a process of a given name. Other restriction functionalities can be programmed for a restrictor 415. As an example, the restrictor, i, indicates that the string, eggdrop.exe, is a case insensitive string. As an example, the restrictor, u, indicates that the string, eggdrop.exe, to be matched will be for data in the memory region for the user mode.

FIG. 4B is a block diagram of an example rule 400A for a fuzzy hash algorithm, in accordance with an embodiment of the invention. The engine 160 is configured to use the rule 400A in order to perform the below operations. The rule type, Z, permits an expression 400A to generate a fuzzy hash value based on a search of the content of a target data object field 210 (FIG. 2) and this calculated fuzzy hash value will be compared with the reference fuzzy hash value 420 as indicated in the string between the quotation marks "" in FIG. 4B.

Typically, the fuzzy hash value is a sequence of bytes (e.g., hexadecimal bytes). The fuzzy hash value can be calculated against varied data streams and can then be used to determine the percentage of match between those data streams. For example, in FIG. 4B, the rule type, Z, indicates a fuzzy hash algorithm is performed by the expression, and the string 420 of the fuzzy hash value between the quotation marks " ") is F92EC292021302C252C76ECECDF12E5DADA34BA-94456D.

As an example, there are the multiple restrictors 430 and 435 that are operated by the Boolean operator 440 "AND". The restrictor 430 is the text, k, at the end of the fuzzy hash string, indicating that the kernel mode is applicable for the content being scanned (i.e., the comparison is with content in the kernel module or kernel region). The restrictor 435 indicates a match percentage value 437 that applies against the fuzzy hash. In this example, the parameter 437 indicates that the match percentage value 435 must be approximately 80% or better between the reference fuzzy hash value and the calculated fuzzy hash value of the content of the target data object field 210 (FIG. 2). The restrictor(s), such as the match percentage parameter 437, can be programmed via engine 160 to other values. For example, the parameter 437 can be programmed to other percentages such as, e.g., 85% or higher, or less than 85%. As an example operation, the engine 160 would calculate the fuzzy hash value of substrings in the target data object field 210 and compare this calculated fuzzy hash value with the reference fuzzy hash value that is noted in the string 420. If there is a given match percentage value (as set by parameter 437) that is satisfied between the calculated fuzzy hash value of the target object field 210 and the reference fuzzy hash value in string 420, then the expression 400 would fire, indicating a match occurrence.

In the example of FIG. 4C, the engine 160 can compare 450 a source digital DNA sequence 455 (which contains a reference fuzzy hash value) with a target digital DNA sequence 330 which contains a calculated fuzzy hash value that is determined by the engine 160 as similarly discussed above. An example of a reference fuzzy hash value is shown by the string 420 in FIG. 4B. The value of a reference fuzzy hash value is programmable by the programmer, depending on the specific object/attribute or type/class of data object that the programmer desires to detect by the engine 160. Based on this comparison 450, a detection can be made on attributes of a data object(s) such as, for example, specific files or variation of files, data (including intellectual property) that is cut/pasted on documents or embedded in documents or attached to email messages, variants of malware or malware protected by a packer or encryptor, variations of the same codebase, executables including executables that have been altered at runtime, and the use of a specific algorithm such as an encryption algorithm, or other types of data objects. The reference fuzzy hash value in the source DDNA sequence 455 can be pre-set in the string 420 values in the rule 400A of FIG. 4B, in order to detect for particular attributes or data objects such as those discussed above. For example, the reference fuzzy hash value in the source DDNA sequence 455 can be made to match root-kits or match particular malware or spyware, or match attributes in a code, text, binary, or high entropy data, or match other types/class of data objects or attributes.

Figure 6:
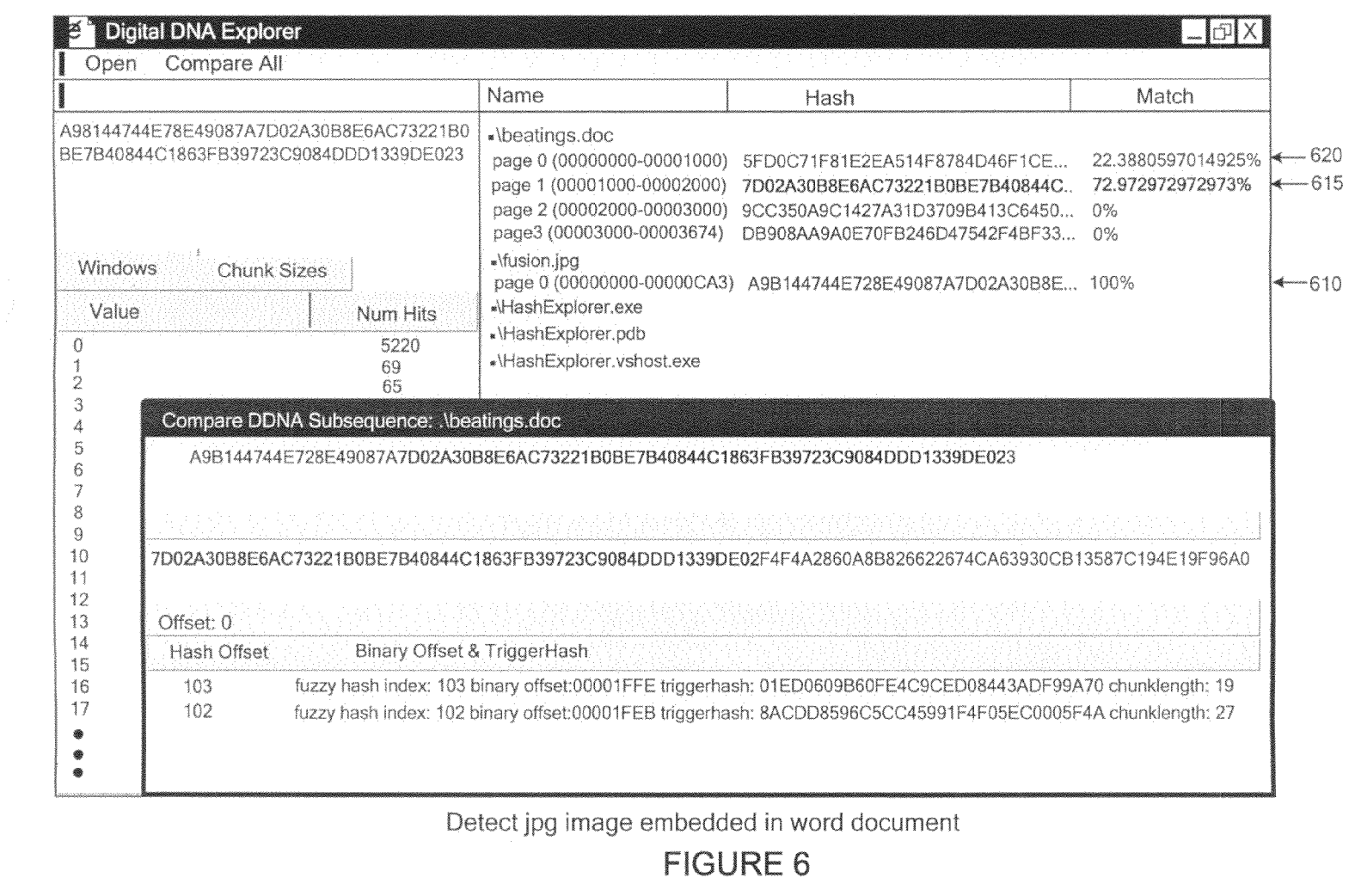

FIGS. 5-6 are example screenshots of comparison results of a sample source digital DNA sequence (of an attribute or content of a source data object) and target digital DNA sequences of target data objects 165 (FIG. 2). In the example of FIG. 5, multiple versions of a target data object (i.e., a document named Rustock.B) are detected by the engine 160 (FIG. 1). In a first version of the target data object with a calculated fuzzy hash value that is calculated by the engine 160, the 39.28% matching value (see arrow 505) on page 0 and 37.288% matching value (see arrow 510) on page 1 indicate the respective match percentage values in the comparison result between the source DDNA sequence and the target DDNA sequence. If the matching percentage parameter (e.g., parameter 437 in FIG. 4B) with a value of 80% is used for the rule 400A (FIG. 4B), then the rule 400A would not fire due to the lesser calculated fuzzy hash values of 39.28% and 37.288%.

In contrast, in a second version of the target document with a calculated fuzzy hash value, the 100% value (see arrow 515) on page 0 indicates a match percentage value in the comparison result between the source DDNA sequence and the target DDNA sequence. If the matching percentage parameter (e.g., parameter 437 in FIG. 4B) with a value of 80% is used for the rule 400A (FIG. 4B), then the rule 400A would fire due to the higher calculated fuzzy hash values of 100%.

FIG. 6 is a screen shot of another example of the fuzzy hash comparison method that is performed by the engine 160 (FIG. 1). The engine 160 (FIG. 1) has also determined that a source object (e.g., a source JPEG image or another type of object or file) is embedded in the target object (e.g., a Word document). The engine 160 determines a 100% matching percentage value (see row 610) of the comparison between a reference fuzzy hash value of the source object (i.e., a fuzzy hash value of the source JPEG image) and a calculated fuzzy hash value of an image embedded in the target object. Therefore, the engine 160 has determined that the source object (e.g., a source JPEG image) is contained or embedded in the target object (e.g., a Word document named "beatings"), based on the determined matching percentage value of 100%.

The engine 160 (FIG. 1) has also determined a 72.97% matching percentage value (see row 615) based on the comparison between the reference fuzzy hash value of the source object (i.e., the fuzzy hash value of the source JPEG image) and a calculated fuzzy hash value of the second page of the target object (e.g., a Word document). Therefore, the engine 160 has determined that the source object is contained or embedded in the second page of the target object, based on the determined matching percentage value of 72.97% which is greater than a threshold percentage value of, e.g., approximately 50% (or other significant percentage value). In contrast, the engine 160 has determined that the source object is not contained in the first page of the target object, based on the determined matching percentage value of 22.388% (row 620) which is much less than a threshold percentage value of, e.g., approximately 50% (or other significant percentage value).

As an example, the source object is data (e.g., a JPEG image) that is subject to intellectual property protection (e.g., copy-write or trademark protection). The engine 160 can be used to detect whether or not a source object (which could be under intellectual property protection or could be proprietary information) is present in any particular target data object (e.g., a target document, a target file, a target code, or other target objects).

Figure 7:
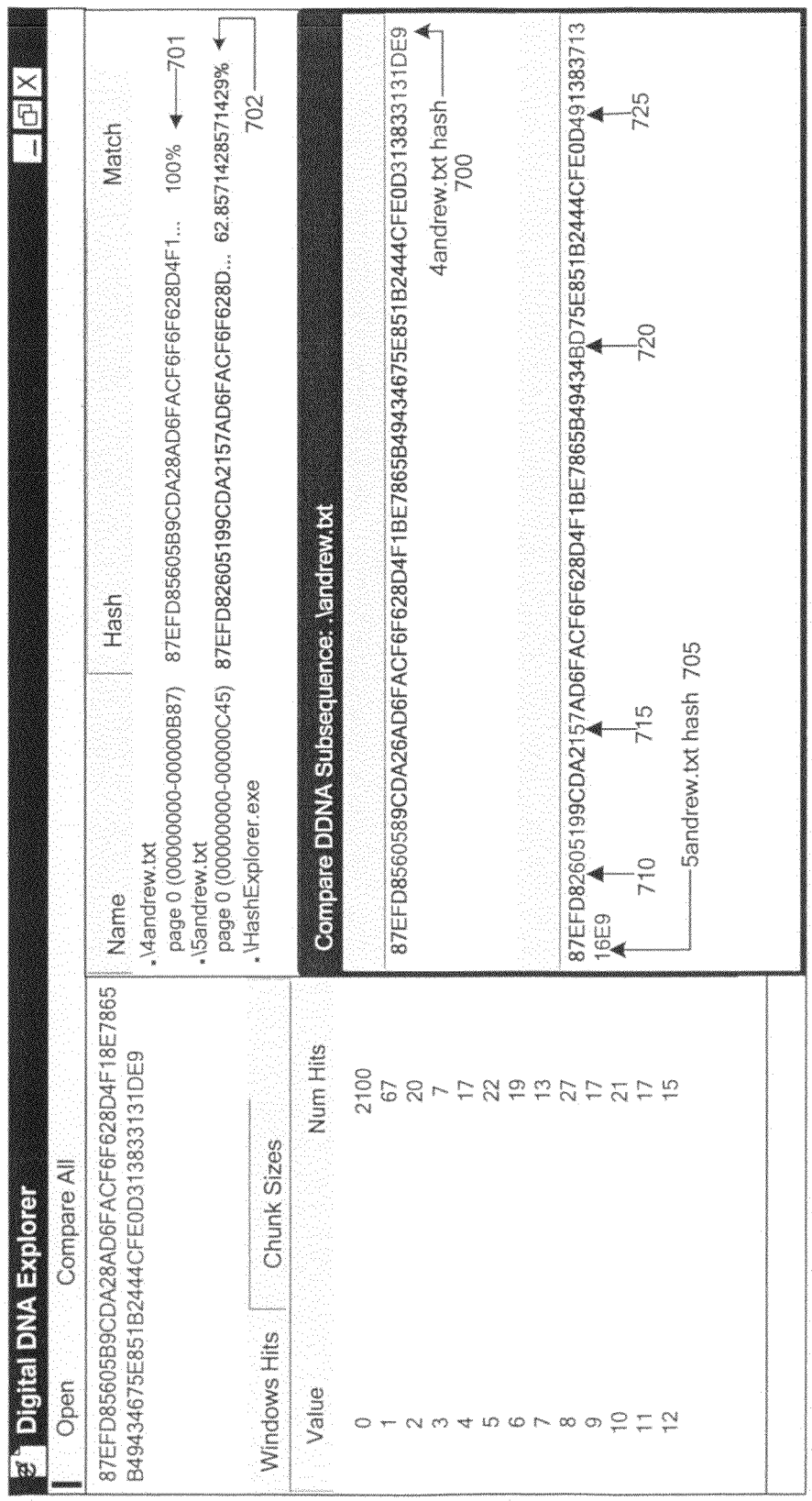
FIG. 7 is a screen shot that shows the comparison results of two objects that are significantly similar, in accordance with an embodiment of the invention.

FIG. 7 is a screen shot that shows the comparison results of two objects (e.g., text files) that are significantly similar. Assume that a fuzzy hash is created by the engine 160 (FIG. 1) for a first data object which will be the text file "4andrew.txt" in this example. This fuzzy hash is, for example, the fuzzy hash 330 (FIG. 3) in a DDNA sequence. Therefore, the engine 160 determines a 100% matching percentage value (see row 701) of the comparison between this fuzzy hash and a subsequent calculated fuzzy hash of that same text file "4andrew.txt".

Assume then that a second data object, which will the text file 5andrew.txt in this example, is created, where text file 5andrew.txt is significantly similar in content to 4andrew.txt.

As an example, 5andrew.txt could vary from 4andrew.txt by only some random amount of text or embedded content. As a specific example, random (or new) content is could be inserted (typed) into the original content of the text file 4andrew.txt, resulting in the new text file 5andrew.txt. This random or new content could be, for example, text, paragraph(s), embedded content, or other new content that is inserted in the original content of the data object 4andrew.txt. The engine 160 calculates the fuzzy hash 700 for the first data object (4andrew.txt) and calculates the fuzzy hash 705 for the second data object (5andrew.txt). The portions 710, 715, 720, and 730 indicate the random (or new) inserted content that has been inserted (typed) into the original content of the text file 4andrew.txt and will not have matches in the fuzzy hash 700. The 62.85% match percentage value (row 702) for 5andrew.txt indicates the match amount between the fuzzy hash 700 and fuzzy hash 705.

Figure 8:
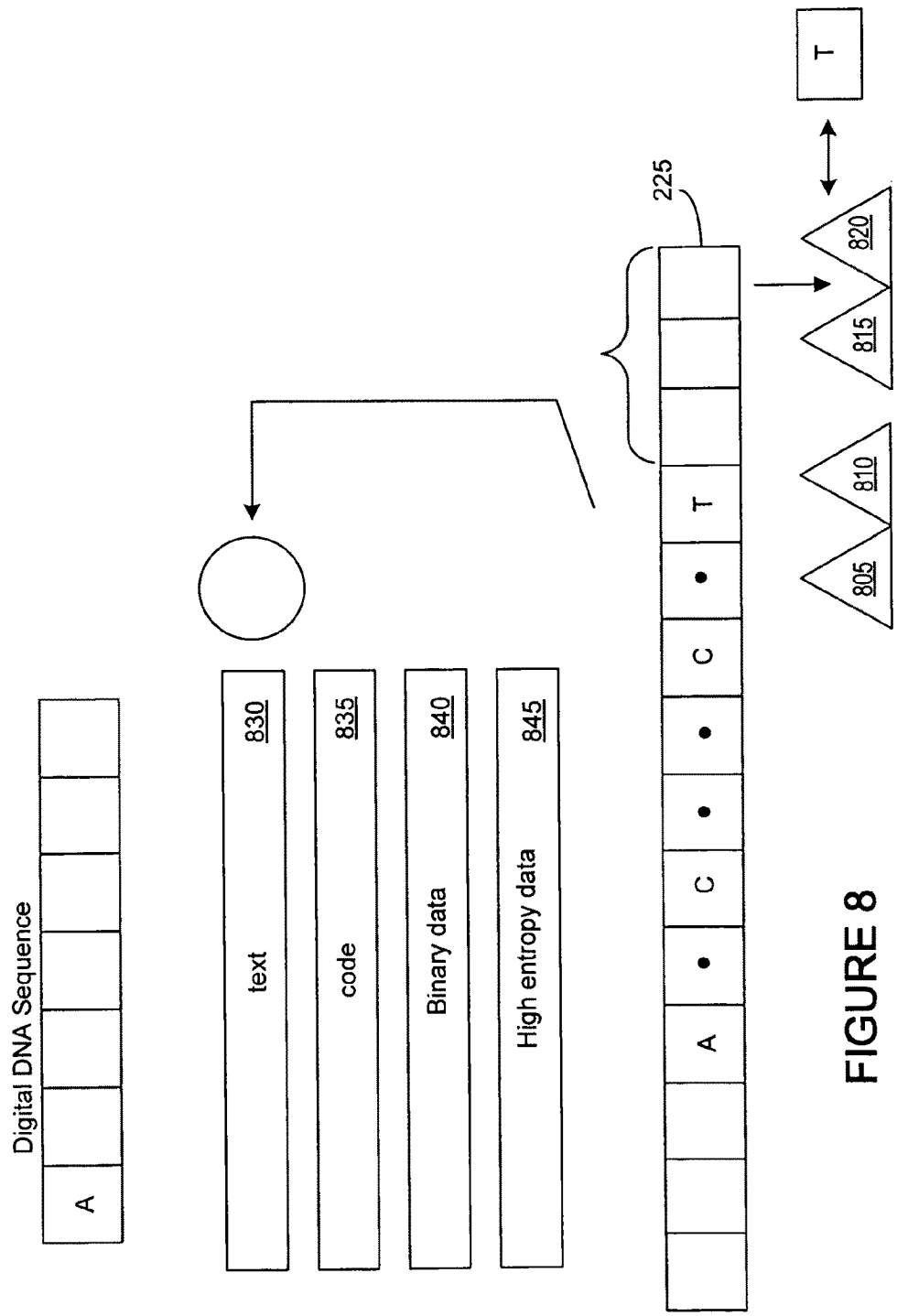
FIG. 8 is a block diagram of additional features that can be used in an embodiment of the invention.

FIG. 8 is a block diagram of additional features that can be used in an embodiment of the invention. The detectors 805-820 are used to detect properties of a data stream 825 of a target data object 165 (FIG. 2). The detectors 805, 810, 815, and 780 detect for properties 830, 835, 840, and 845, respectively. Properties 830, 835, 840, and 845 are text, code, binary data, and high entropy data, respectively. High entropy data is defined as a highly random data such as, for example, compressed data or encrypted data. Non-high entropy data would be, for example, text data, highly structured data, or data with a repeating pattern(s) or repeating character(s) (e.g., repeated word, carriage return at the end of lines, or punctuations, etc.). Code data would include, for example, arithmetic functions, constants, instructions, and/or the like. Text data would include, for example, delimiter characters, frequency of nouns, repeated carriage return at the end of lines, punctuations, and/or the like. Binary data would include, for example, probable pointes, small integers, length prefixed buffers, and/or the like.

Figure 9:
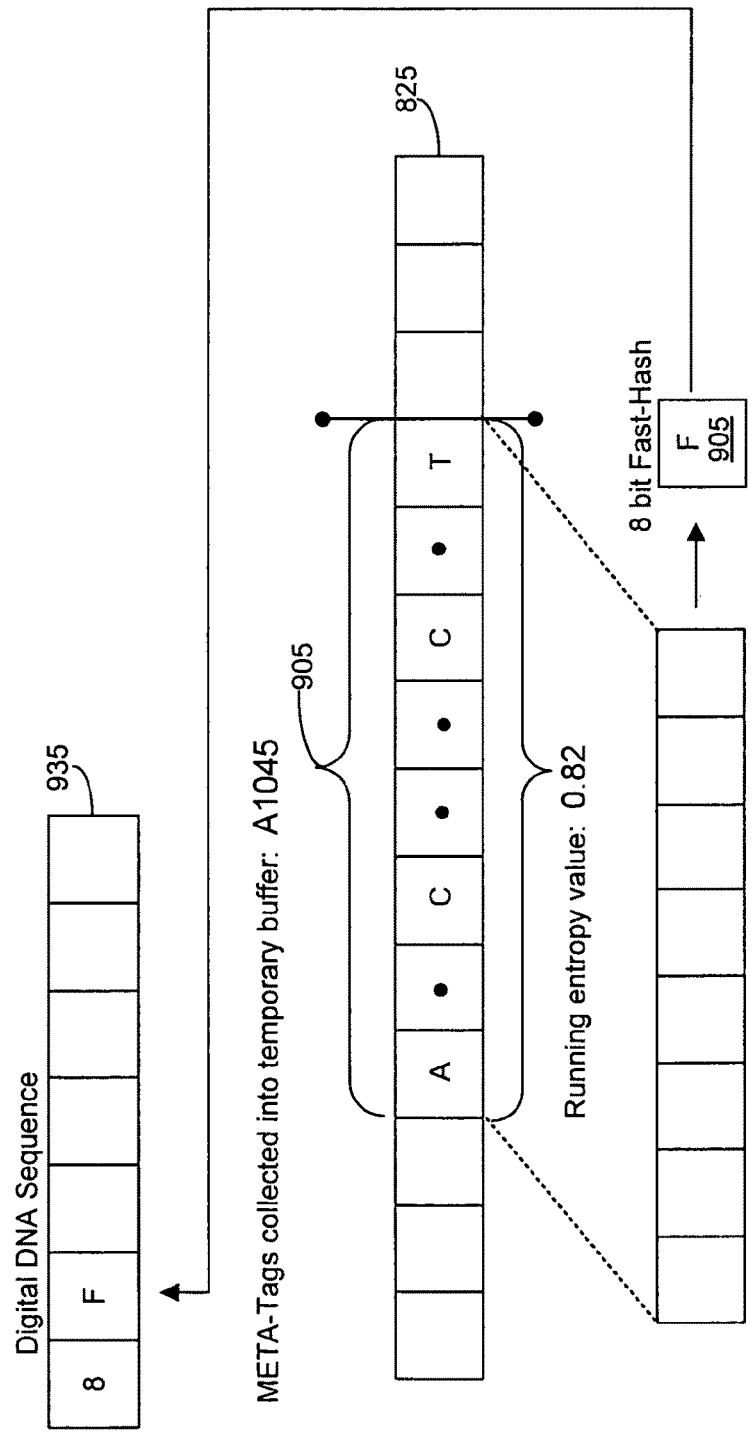
FIG. 9 is a block diagram of additional features that can be used in an embodiment of the invention.

In an embodiment of the invention, the detector 820 determines if the entropy of the data stream 825 falls below or above an entropy threshold value T. For example, as shown in FIG. 9, assume that the entropy threshold value T is preset at an example value 0.82, although other threshold values can be used as well. If the entropy value T is at least 0.82 (or higher) in window 905, then the engine 160 will hash over the contents that are overlapped by the window 905 in the actual byte stream 825, instead of hashing the meta-tags 314 (FIG. 3) in the meta buffer 315 as previously described above with reference to FIG. 3. The spliced portion of the calculated hash value is then stored in a DDNA sequence as part of the fuzzy hash 330 (FIG. 3) as similarly discussed above.

In another embodiment of the invention as also shown in FIG. 9, when the entropy value of the content within a window 905 is at or above the entropy threshold value T, then the triggering is handled by a shift register (e.g., 8 bit shift register) and is not handled by code branch instructions.

As an example, the single 8 bit shift register, which is initialized to zero at a beginning window, is modified per the following example algorithm:

```
unsigned char bz = 0;
for(int i=0;i<SIZE_OF_WINDOW;i++)
{
    unsigned char b = __test[i];
    bz = bz << 1;
    bz = bz ^ b;
    if( (bz != 0) && ((bz % 32)==0))
```

-continued

```
        {
            printf("%02X –\n", bz);
        }
        else
        {
            printf("%02X\n", bz);
        }
    }
```

The above code example produces a stream of output bytes, as printed as bz. The algorithm produces a constant stable output if given a constant stream of input.

In the above example algorithm, the following conditions occur. Streams of zero input values produce a constant stable output of zero output values. Streams of Intel x86 NOP instructions (0x90) produce constant stable output (0x1A). Streams of byte-padding used by Microsoft C++ compiler (0xCC) produce constant stable output (0x44). Changes in input cause changes in output. Changes from one constant stream of input to another constant stream of input cause a short-lived turbulence in the output (lasting for several cycles), after which a new stable state will be reached.

Triggering is determined by a simple comparison on the linear shift register to determine if it contains a multiple of 32. The choice of 32 as opposed to other multiples is not arbitrary. The value 32 has been observed to produce well-distributed triggers over many different data input types (code, text, graphics data) and trigger points tend to be spaced apart by low double-digit lengths (for example, 15-40 bytes apart). This is ideal for the subsequent fuzzy-hash generation. Changes between long strings of constant input (for example, switching from a stream of 0x90 bytes to a string of 0x00 bytes) has a tendency to produce a trigger (aka 'proc').

For example, the following input as shown in Table 2.

TABLE 2

"\x90\x90\x90\x90\x90\x90\x90\x90\x90\x90" \
"\x90\x90\x90\x90\x90\x90\x90\x90\x90\x90" \
"\x00\x00\x00\x00\x00\x00\x00\x00\x00\x00" \
"\x00\x00\x00\x00\x00\x00\x00\x00\x00\x00" \

The data input as shown in Table 2 produces a short-lived turbulence in the output which rapidly settles into a new stable-state output. This transition lasts only for a few cycles, but causes a triggering event as shown in Table 3.

TABLE 3

| | |
|---|---|
| 1A | |
| 1A | |
| 1A | |
| 1A | |
| 1A | |
| 1A | |
| 1A | |
| 1A | |
| 1A | |
| 1A | |
| 1A | |
| 1A | <-- stable output due to 0x90 ends here. |
| 34 | <-- new 0x00 stream begins here. |
| 68 | |
| D0 | |
| A0 | - trigger |
| 40 | - trigger |
| 80 | - trigger |
| 00 | <-- at this point, the output has stabilized |
| 00 | |

TABLE 3-continued

| |
|---|
| 00 |
| 00 |
| 00 |
| 00 |
| 00 |
| 00 |
| 00 |
| 00 |
| 00 |
| 00 |
| 00 |

The bin, bz, is first initialized to bz=0 in the above example algorithm. The bin bz value is then modified to a value of each incoming input byte. An exclusive OR logical operation is performed for each current bin bz value and an incoming input byte. As a result, the transition output values as discussed above will occur as the input byte values transition from a first constant input value to a second constant input value. Note also that the size of the window, as also discussed above, is a parameter that can be varied.

The engine 160 (FIG. 1) will then place the fast hash value 910 ("F" in the FIG. 9 example) in the DNA sequence 935 as part of the content of a fuzzy hash for the data object 925, as similarly discussed in FIG. 3.

Figure 10:
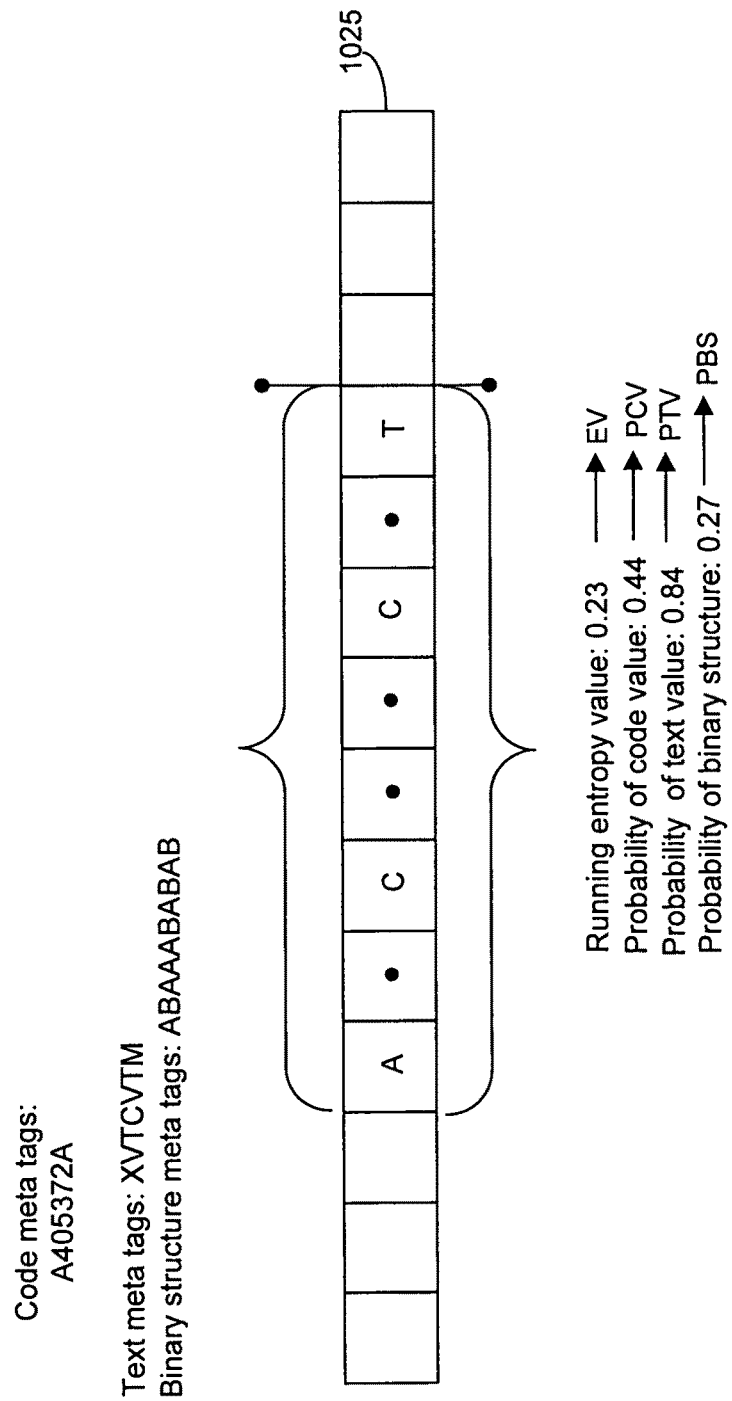
FIG. 10 is a block diagram of additional features that can be used in an embodiment of the invention.

On the other hand, if the entropy value is not at (or not above) the threshold 0.82, the detectors 805-815 will detect for the probability of text, code, and binary data (binary structure), respectively. The detectors 805-815 will detect if the contents in a data object are text, code, or binary data by use of known comparison methods that scan the attributes, metadata, and contents in a data object. The mode (text mode, code mode, or binary data mode) is determined by the data type with the highest probability as determined by the detectors 805-815. For example, in FIG. 10, the running entropy value (EV) for a data stream 1025 in a data object is 0.23 (which is below the example entropy threshold value T of 0.82). As a result, the non-high entropy mode will trigger because the running entropy value EV is below the threshold value T. In contrast, the high entropy mode will trigger if the running entropy value EV is at or above the threshold value T.

When the mode switches from the high entropy mode to the non-high entropy mode, the detectors 805-815 will perform the following probability value detection to determine code, text or binary structure during the non-high entropy mode. As example values, the detector 805 determines the probability of code value (PCV) at 0.44, the detector 810 determines the probability of text value (PTV) at 0.84 and the detector 815 determines the probability of binary structure (PBS) at 0.27. Since the probability of text value (PTV) is the highest probability value, the engine 160 will shift into the text mode.

Each of the above mode has its own triggering criteria (that can be preset by the user) and its own calculation method for calculating the 1-byte DDNA marker (i.e., spliced portion) to be put in the DDNA sequence that will contain the fuzzy hash. Therefore, triggering can be unique to each mode. In a preferred embodiment, the algorithm can be optimized for 32 bit processors.

As mentioned above, for code mode, triggering can be based on conditions such as, for example, branch conditions or entry/exit conditions. Each mode will have its own associated trigger.

It is noted that text tends to be delimited by special characters, such as punctuation, and meta characters such as carriage returns or line feeds. These are ideal characters to produce triggers as they tend to isolate sentences, words or values, or phrases that may be unique to a text, intellectual property, diagram, spreadsheet, accounting data, personal information, or other formatted text. If text triggering is designed for larger regions of text, such as entire sentences, the splicing and hash that can be used may be longer than a single byte value, so as to better represent the content of text that is being hashed.

It is also noted that binary structures tend to be aligned on 32 bit boundaries, due to the 32 bit nature of most computing hardware. A method of triggering to consume 32 bits at a time. Other methods may detect zero padding around numbers to determine if, for example, the data structure contains 16 bit values instead of 32 bit values, or a combination of different sizes. For example, if the binary structure contains [00 16 00 2B 00 3B 01 77], the use of zero padding tends to indicate the structure contains four values, 0x0016, 0x002B, 0x003B, 0x0177, as opposed to two 32 bit values 0x0016002B, 0x003B0177, since zeros would pad most significant bytes of the 16 bit values.

Figure 11:
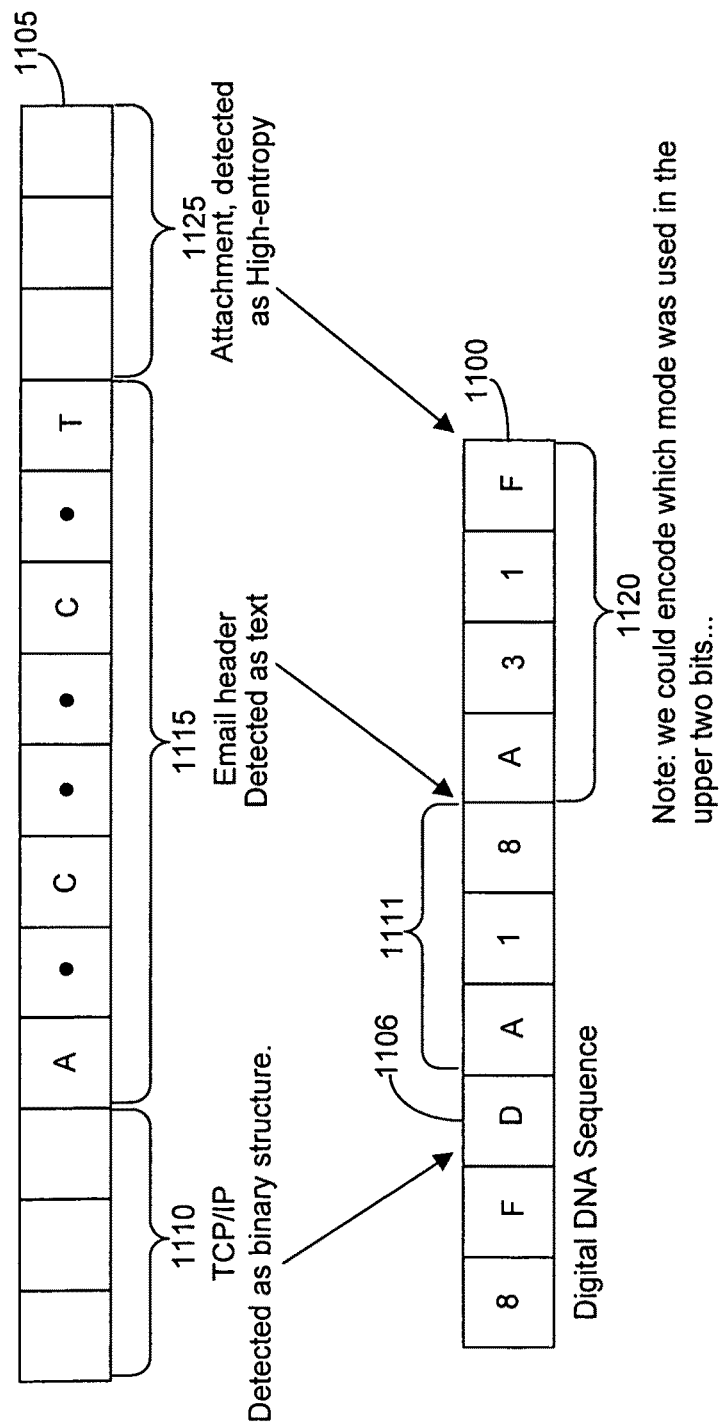
FIG. 11 is a block diagram that illustrates a DDNA sequence that will contain a fuzzy hash for a data stream of a data object, in accordance with an embodiment of the invention.

FIG. 11 is a block diagram that illustrates a DDNA sequence 1100 that will contain a fuzzy hash for a data stream 1105 of a data object. In the example of FIG. 11, the data stream 1105 is an example email message with an attachment, when multiple modes are used when detecting the stream 1105. The engine 160 (FIG. 1) performs the following calculations. The marker 1106 ("D") is calculated for the TCP/IP protocol 1110 which is detected as binary structure in the data stream 1105. The marker 1111 ("A18") is calculated for the email header 1115 which is detected as text in data stream 1105. The marker 1120 ("A31F") is calculated for the email attachment 1125 which is detected as a high entropy content in the data stream 1105. Note that the mode used during the above calculations can be encoded by the engine 160 in the upper two bits in a DDNA sequence 1100 that will contain the calculated fuzzy hash of the stream 1105. The engine 160 (FIG. 1) can then compare this calculated fuzzy hash of the target stream 1105 with a reference fuzzy hash, in order to classify the contents of the target stream 1105 as similarly discussed above.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored, including embedded devices such as Field Programmable Gate Arrays (FPGAs) or other specialized equipment. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of classifying a data object by use of a fuzzy hash, the method comprising:
   aligning a window in a target data object;
   reading content within the window;
   hashing the content within the window in order to calculate a hash value;
   splicing a spliced portion from the hashed value; and
   storing the spliced portion as part of a fuzzy hash.

2. The method of claim 1, further comprising:
   comparing the fuzzy hash with a reference fuzzy hash in order to classify the data object.

3. The method of claim 1, further comprising:
   storing, into a buffer, a plurality of meta-tags corresponding to data blocks that are overlapped by the window, wherein a meta-tag corresponding to an associated data block.

4. The method of claim 1, wherein the hash comprises a summation of contents within the window.

5. The method of claim 1, wherein calculation of the hash is initiated by a trigger.

6. The method of claim 1, wherein the spliced portion comprises a significant byte of the hash.

7. The method of claim 1, further comprising:
   determining a running entropy value for contents that are overlapped by the window;
   if the running entropy value is at least at a threshold value, then shifting into a high entropy mode; and
   if the running entropy value is below a threshold value, then shifting into a non-high entropy mode.

8. The method of claim 7, further comprising:
   in the high entropy mode, using a trigger associated with the high entropy mode.

9. The method of claim 8, wherein the trigger comprises a shift register.

10. The method of claim 8, further comprising:
    performing a hash of the contents that are overlapped by the window, in the high entropy mode.

11. The method of claim 8, further comprising:
    in the non-high entropy mode, shifting into one of a text mode, code mode, or binary structure mode.

12. The method of claim 11, further comprising:
    in the text mode, using a trigger associated with the text mode in order to initiate calculation of the hash.

13. The method of claim 11, further comprising:
    in the code mode, using a trigger associated with the code mode in order to initiate calculation of the hash.

14. The method of claim 11, further comprising:
    in the binary structure mode, using a trigger associated with the binary structure mode in order to initiate calculation of the hash.

15. The method of claim 11, further comprising:
    using probability values of the text mode, code mode, or binary structure mode in order to determine if a shift will be made to the text mode, code mode, or binary structure mode during the non-high entropy mode.

16. The method of claim 11, further comprising:
    in the non-high entropy mode, performing a hash of meta-tags of the content that are overlapped by the window.

17. The method of claim 1, wherein the fuzzy hash comprises a calculated sequence of bytes.

18. An apparatus for classifying a data object by use of a fuzzy hash, the apparatus comprising:
    an engine, executed by a processor, configured to align a window in a target data object, read content within the window, hash the content within the window in order to calculate a hash value, splice a spliced portion from the hashed value; and store the spliced portion as part of a fuzzy hash.

19. The apparatus of claim 18, wherein the engine is configured to compare the fuzzy hash with a reference fuzzy hash in order to classify the data object.

20. The apparatus of claim 18, wherein the engine is configured to store, into a buffer, a plurality of meta-tags corresponding to data blocks that are overlapped by the window, wherein a meta-tag corresponding to an associated data block.

21. The apparatus of claim 18, wherein the hash comprises a summation of contents within the window.

22. The apparatus of claim 18, wherein calculation of the hash is initiated by a trigger.

23. The apparatus of claim 18, wherein the spliced portion comprises a significant byte of the hash.

24. The apparatus of claim 18, wherein the engine is configured to determine a running entropy value for contents that are overlapped by the window, and if the running entropy value is at least at a threshold value, then shift into a high entropy mode, and if the running entropy value is below a threshold value, then shift into a non-high entropy mode.

25. The apparatus of claim 24, wherein the engine is configured to use a trigger associated with the high entropy mode, in the high entropy mode.

26. The apparatus of claim 25, wherein the trigger comprises a shift register.

27. The apparatus of claim 25, wherein the engine is configured to perform a hash of the contents that are overlapped by the window, in the high entropy mode.

28. The apparatus of claim 25, wherein the engine is configured to shift into one of a text mode, code mode, or binary structure mode, in the non-high entropy mode.

29. The apparatus of claim 28, wherein the engine is configured to use a trigger associated with the text mode in order to initiate calculation of the hash, in the text mode.

30. The apparatus of claim 28, wherein the engine is configured to use a trigger associated with the code mode in order to initiate calculation of the hash, in the code mode.

31. The apparatus of claim 28, wherein the engine is configured to use a trigger associated with the binary structure mode in order to initiate calculation of the hash, in the binary structure mode.

32. The apparatus of claim 28, wherein the engine is configured to use probability values of the text mode, code mode, or binary structure mode in order to determine if a shift will be made to the text mode, code mode, or binary structure mode during the non-high entropy mode.

33. The apparatus of claim 28, wherein the engine is configured to perform a hash of meta-tags of the content that are overlapped by the window, in the non-high entropy mode.

34. The apparatus of claim 18, wherein the fuzzy hash comprises a calculated sequence of bytes.

35. An article of manufacture, comprising:
a non-transitory computer-readable medium having stored thereon instructions to:
align a window in a target data object;
read content within the window;
hash the content within the window in order to calculate a hash value;
splice a spliced portion from the hashed value; and
store the spliced portion as part of a fuzzy hash.

36. An apparatus, comprising a processor, for classifying a data object by use of a fuzzy hash, the apparatus comprising:
means for aligning a window in a target data object;
means for reading content within the window;
means for hashing the content within the window in order to calculate a hash value;
means for splicing a spliced portion from the hashed value; and
means for storing the spliced portion as part of a fuzzy hash.

* * * * *